PHASE AND FREQUENCY MODULATION SYSTEM

Filed Oct. 11, 1945 2 Sheets-Sheet 1

Inventor:
LIONEL T. BIRD
BY Moses, Nolte, Crews & Berry
Attorneys

Feb. 27, 1951 L. T. BIRD 2,543,222

PHASE AND FREQUENCY MODULATION SYSTEM

Filed Oct. 11, 1945 2 Sheets-Sheet 2

Inventor:
LIONEL T. BIRD
BY Moses Nolte Crews & Berry
Attorneys

Patented Feb. 27, 1951 2,543,222

UNITED STATES PATENT OFFICE 2,543,222

PHASE AND FREQUENCY MODULATION SYSTEM

Lionel T. Bird, Mount Royal, Quebec, Canada

Application October 11, 1945, Serial No. 621,737

14 Claims. (Cl. 332—23)

This invention relates to improvements in both phase modulation and frequency modulation transmission systems.

In systems at present in use, phase modulation is effected by the addition of two radio frequency currents having a fixed phase difference of 90°, the phase of the combination being shifted in response to the modulating E. M. F. by applying linear amplitude modulation to one or both of the component currents. The weakness of such systems is that the angle of phase shift is not directly proportional to the amplitude of the modulating E. M. F. unless the angle is very small, and, for freedom from distortion in transmission of music, it is necessary for the maximum angle to be limited to much less than 30°. This restriction makes it necessary to employ many stages of frequency multiplication after modulation in order to effect the required phase shift or frequency swing in the output currents, necessitating complicated systems of heterodyning to arrive at the desired unmodulated carrier frequency when the required phase or frequency shift is achieved. In addition, unless special means are adopted to avoid it, the high frequency-multiplication ratio imposes severe demands upon the frequency stability of the initial source of radio frequency current.

It is the object of the present invention to remove these restrictions and avoid these difficulties by providing means whereby, to a very close degree of approximation, the angle of phase shift to any predetermined limit is kept strictly proportional to the amplitude of the modulating E. M. F.

The invention is illustrated in the accompanying drawings in which

Figures 1, 2, 3:
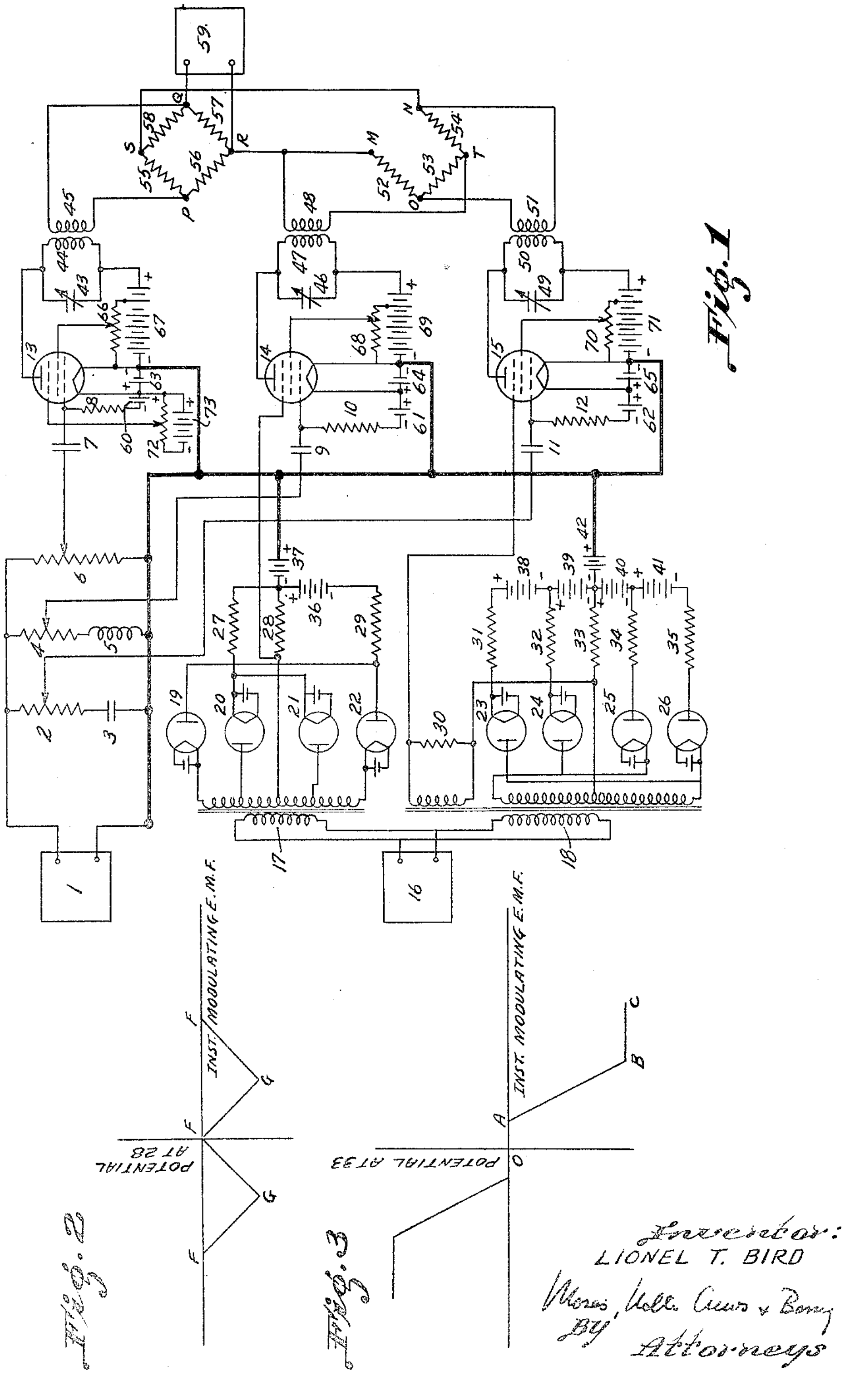

Figure 1 represents the preferred embodiment of the system; and

Figures 2, 3, 4, 5, 6, 7, 8, 9 and 10 illustrate the relationship between the E. M. F.'s appearing at various points in the system.

Referring now to Figure 1, 1 is a source of radio frequency (R. F.) energy such as a master oscillator which is preferably crystal controlled. 2 is a variable resistor, and 3 a capacity connected in series across the output of source 1.

A resistor 4, similar to 2, in series with an inductor 5 the reactance of which is approximately equal to that of capacity 3 is also connected across the source 1, and 6 is a potentiometer, which is also connected across said source.

16 is a source of modulating energy the output of which is fed in parallel to the primary windings of two transformers 17 and 18.

19, 20, 21 and 22 are rectifiers, represented as diodes. The secondary winding of transformer 17 is connected at one end to the cathode of diode 19, and at the other end to the cathode of diode 22, and two tapping points, situated respectively between each end of said secondary winding and a central tapping point on said winding, are connected respectively to the anodes of diodes 20 and 21. The anodes of diodes 19 and 22 are connected together and the cathodes of diodes 20 and 21 are also connected together, the latter common connection being connected through a resistor 27 and a further resistor 28 to said central tapping point, and the junction point of said resistors 27 and 28 is connected through a source of D. C. potential 36 to a further resistor 29 connected to the anodes of diodes 19 and 22.

23, 24, 25 and 26 are rectifiers, also repre- transformer 18 is connected at one end to the cathode of diode 26 and to the anode of diode 23, the other end of said secondary winding being connected to the cathode of diode 25 and to the anode of diode 24. The cathode of diode 23 is connected through resistor 31, sources of D. C. potential 38 and 39, and resistor 33 to a central tapping point upon said secondary winding, and sented as diodes. The secondary winding of the the anode of diode 26 is connected through resistor 35, sources of D. C. potential 41 and 40, and resistor 33 to said tapping point. The cathode of diode 24 is connected through resistor 32 to the junction of sources 38 and 39, and the anode of diode 25 is connected through resistor 34 to the junction of sources 40 and 41. An additional secondary winding on the core of the transformer 18 is connected at one end to the central tapping point on the secondary of transformer 18 and is shunted by a resistor 30.

13, 14 and 15 are amplifier tubes, shown for the purpose of this explanation as pentodes, bias potential being applied through resistor 8 from source 60, resistor 10 from source 61, and resistor 12 from source 62 to the control grids of said tubes respectively. Heating current is applied from sources 63, 64 and 65 to the cathodes of said tubes respectively. D. C. potential for the screen grid of tube 13 is supplied by means of resistor 66 connected across source 67. Similarly, potential for the screen grid of tube 14 is supplied by means of resistor 68 and source 69, and for tube 15 by means of resistor 70 and source 71. Fixed potential is applied to the suppressor grid of tube 13 from source 73, the value of said potential being adjusted by means of resistor 72. The anode of tube 13 is connected to one side of a tuned circuit constituted by variable capacity 43 and inductor 44, the other side of said tuned circuit being connected to the positive terminal of source 67. Similarly, the anodes of tubes 14 and 15 are connected through tuned circuits 46, 47 and 49, 50 to the positive terminals of sources 69 and 71 respectively. The cathodes of tubes 13, 14 and 15 are connected through a common lead to source 1. A source of D. C. potential 37 is connected between said common lead and the junction points of resistors 27 and 28, and a further source of D. C. potential 42 is connected between said common lead and the junction point of sources 39, 40 and resistor 33. A variable tapping point on resistor 2 is connected through capacity 11 to the control grid of tube 15, a variable tapping point on resistor 4 is connected through capacity 9 to the control grid of tube 14, and a variable tapping point on potentiometer 6 is connected through capacity 7 to the control grid of tube 13. The central tapping point on the secondary winding of transformer 17 is connected to the suppressor grid of tube 14, and the end of resistor 30 remote from the junction thereof with the central tapping point on the secondary winding of transformer 18 is connected to the suppressor grid of tube 15.

To the inductors 44, 47 and 50 are coupled coils, respectively 45, 48 and 51, and said coils are connected to a network of resistors 52 to 58, which are all of like value.

A conventional balanced bridge circuit is formed by the resistors 52, 53 and 54 connected in series and the total resistance represented by the network made up of resistors 55 to 58 by connecting one end M of resistor 52 to the junction point R of resistors 56 and 57 and one end N of resistor 54 to the junction point S of resistors 55 and 58. Coil 45 is connected at one end to the junction point P of resistors 55 and 56, the other end being connected to junction point Q of resistors 57 and 58. One end of coil 48 is connected to the junction point T of resistors 53 and 54 and the other end is connected to the junction of points R and M. Coil 51 is connected at one end to the point N and at the other end to the junction point O of resistors 52 and 53. Output is taken from across resistor 57 between the points Q and R to utilization means 59, which may consist of frequency multipliers, filters and power amplifiers as may be required and in accordance with well known and established practice.

The operation of the system will now be described:

The output of oscillator 1, which operates at a frequency considerably lower than that at which final emission from the system takes place, causes an E. M. F. to be developed across the capacity 3, the adjustment of resistance 2 being set so as to cause the E. M. F. applied to control grid of tube 15 through capacity 11 to lag that of said output by 45°. The value of resistor 12 is high in comparison with the reactance of condenser 3. The tapping point on resistor 4 is adjusted so that the E. M. F. applied through capacity 9 to the control grid of tube 14 leads that of the output of oscillator 1 by 45°. Resistor 10 is similar to resistor 12. The potentiometer 6 is adjusted so that the E. M. F. supplied to the control grid of tube 13 through capacity 7 is in phase with that of the oscillator 1.

The source 16 is of constant gain across the band of modulation frequencies in the case of phase modulation and inversely proportional to the frequency in the case of frequency modulation. The output from 16 is fed to transformers 17 and 18 which step up the modulating voltage to the values required to operate the diodes 19 to 26 in the following manner: Let it be assumed for the purpose of explanation that the sense of the secondary winding of transformer 17 is such that, at the instant considered, that end which is connected to diode 19 is positive. In these circumstances the E. M. F. developed by the secondary will tend to make its cathode positive with respect to its anode and no current will flow through it. Similarly, the anode of diode 21 will tend to become negative with respect to its cathode and it, too, will be inoperative. Diode 20, however, will, at the instant considered, have its anode rendered positive with respect to its cathode and this will cause a current to flow through resistors 27 and 28 which will set up a potential across resistor 28 the negative end of which will be the one nearer the connection to the transformer secondary. Similarly, diode 22 will have a negative E. M. F. applied to its cathode by the transformer secondary and the potential across resistor 28. However, the voltage of source 36 is so chosen that it exceeds these applied potentials until a certain predetermined value is reached. For all values of modulating voltage up to this, the potential across resistor 28 will be directly proportional to the instantaneous value of the modulating E. M. F. When this value is exceeded, current will flow through diode 22, resistor 29 and source 36, and return to the transformer through resistors 28 and 27. That portion which flows through resistor 28 will oppose the potential set up across it by current from diode 20. The E. M. F. of the transformer secondary and the values of resistors 27, 28 and 29 are so chosen that as the modulating E. M. F. increases from this point on. the additional current in resistor 28, due to the action of diode 22, causes the potential across resistor 28 to decrease with increasing E. M. F. at the same rate as it previously increased, until, eventually, at an E. M. F. corresponding to maximum modulation, the potential across resistor 28 will have fallen to zero. When the E. M. F. of the secondary is in the reverse sense, the same result is obtained, except that now diodes 19 and 21 are active and diodes 20 and 22 are inactive. Thus the relation between instantaneous audio E. M. F. and instantaneous potential across resistor 28 will be as shown in Figure 2. Referring again to Figure 1, the potential across resistor 28 is applied in series with source 37 to the suppressor grid of pentode 14.

In a somewhat similar manner, diodes 23 to 26 are caused to conduct by the E. M. F. of the secondary of transformer 18. In this case, sources 38 to 41 are so connected that, initially, all anodes are negative with respect to their cathodes, and no current traverses them until a certain E. M. F. is attained. The voltages of the various sources of potential are so selected that initial conductivity takes place in diode 24 or 25 before diode 26 or 23 respectively. During that portion of the cycle in which that end of the secondary which is connected to diodes 24 and 25 is positive, only diode 24 will be active and the resultant current in resistor 33 will be such that the end nearest the transformer will be negative. The rate of increase of this potential will be proportional to the rate of increase of the modulating E. M. F., until the condition is reached at which the voltage of sources 40 and 41, plus the potential across resistor 33, is exceeded and, as the modulating E. M. F. is further increased, diode 23 will conduct, and the resulting current will traverse resistor 32 or 33, or divide between them. The transformer secondary E. M. F. applied to diode 26 is made equal to that applied to diode 24, and resistors 32 and 35 are of equal value and high in comparison with the resistance of the diodes in the conducting condition. As a result, any modulating E. M. F. in excess of that required to start current through diode 26 has negligible effect upon the current in resistor 33, the whole of this current being equal to the additional current passing through diode 24.

Figures 4, 5, 6, 7, 8, 9, 10:
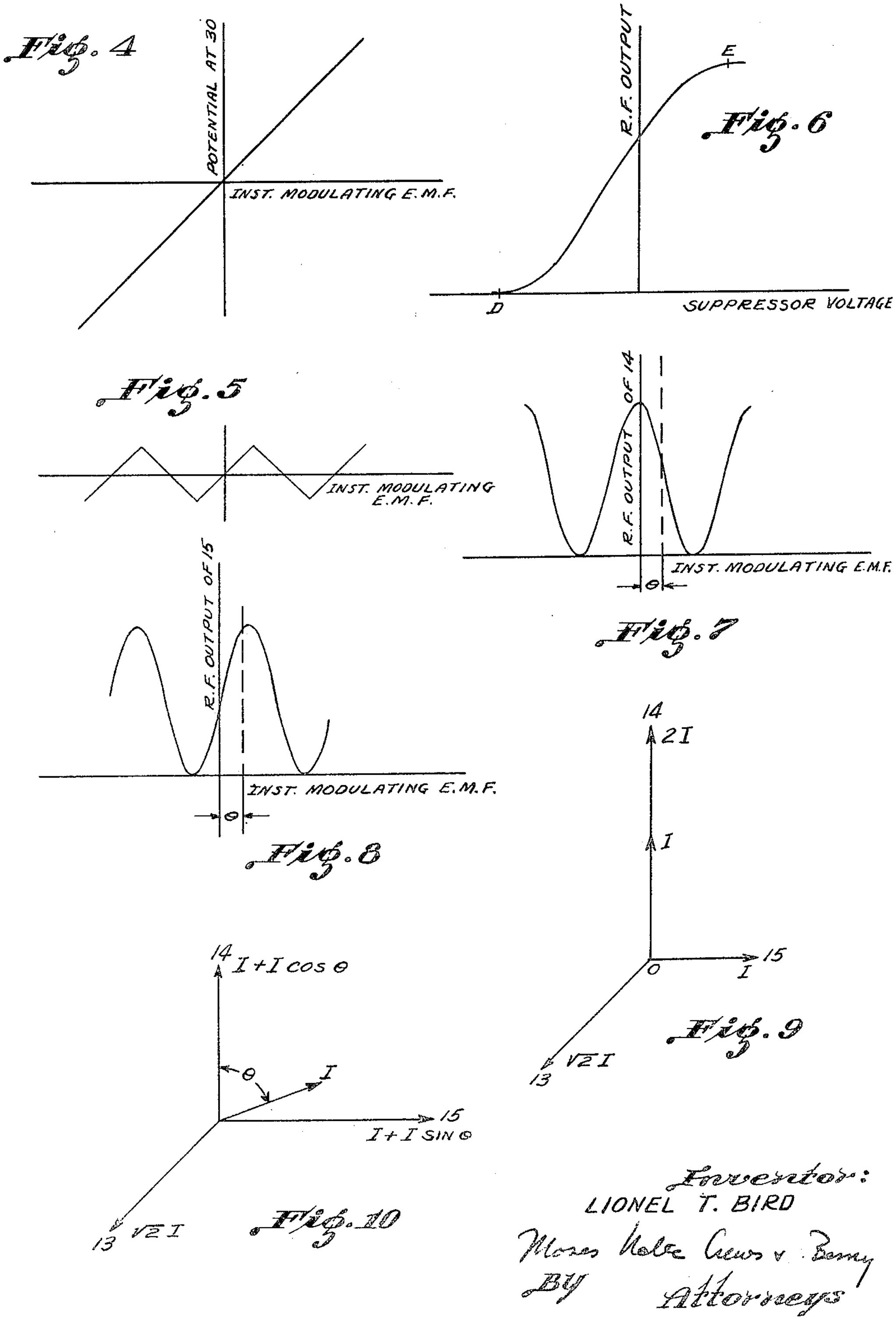

During any portion of the cycle in which the end of the secondary of transformer 18 connected to diodes 24 and 25 is negative, a similar action will take place, but in this case diodes 23 and 25, and resistors 31 and 34 are involved and the potential developed across the resistor 33 is in the reverse sense. As a result, the relationship between instantaneous modulating E. M. F. and potential drop across resistor 33 is as illustrated in Figure 3. From O to A neither idode is active, from A to B diode 24 conducts, and from B to C both are conducting. Referring again to Figure 1, the resistor 30 is connected across a separate secondary winding and the relation between the potential drop across it and the modulating E. M. F. will be a linear one, as shown in Figure 4. The slope of this graph is determined by the transformer ratio and is made exactly one-half that of the slope of portion AB of the graph of Figure 3.

Resistors 30 and 33 are connected in series and the sum of the potentials developed across them is applied to the suppressor grid of pentode 15. The characteristic of this summated potential is obtained by adding together the graphs of Figures 3 and 4, obtaining the graph of Figure 5.

The outputs of tubes 13, 14 and 15 are fed to the tuned circuits 43, 44; 46, 47; and 49, 50 respectively and the outputs of the coils 45, 48 and 51 respectively coupled thereto are fed to the network of resistors 52 to 58, as shown in Figure 1, and thence to the utilization means 59.

The relation between instantaneous amplitude of R. F. output of a typical pentode in terms of instantaneous modulating E. M. F. applied to its suppressor grid is shown in Figure 6. By making the correct selection of all electrode potentials and by adjusting the impedance connected in the anode circuit, it is readily possible to adjust this characteristic to have the same shape from point D to point E, to a very close degree of approximation, as a sine curve between the values $$\frac{-\pi}{2} \text{ and } \frac{+\pi}{2}$$

The voltage of source 37 and the potential drop across resistor 28 are so fixed that the upper limit of potential applied to the suppressor grid of pentode 14 (points F of Figure 2) correspond with the potential required to produce the R. F. output at point E on Figure 6. Similarly, the lower limit (points G of Figure 2) is made to correspond with the modulating potential required for the condition illustrated at D on Figure 6. The net result is that the R. F. output characteristic of tube 14, showing the relation between instantaneous modulating E. M. F. and radio frequency output, will be as the graph of Figure 7, i. e., to a close degree of approximation of the form of $1+\cos\theta$ between the limits $\theta=-2\pi$ to $+2\pi$. In a similar manner, the R. F. output characteristic of pentode 15 can be shown to be the combination of the graphs of Figures 5 and 6 and is illustrated in Figure 8. This characteristic has the form of the curve of $1+\sin\theta$ plotted between the limits $\theta=-2\pi$ and $\theta=+2\pi$.

Pentode 14 is unaffected by the E. M. F.'s appearing in the anode circuit of pentode 15 and vice-versa. However, the potential between points M and N in the resistance network is the half sum or half difference of the E. M. F.'s of coils 48 and 51, depending upon the sense in which these coils are connected to the network. This potential is applied to points S and R of the network consisting of resistors 55 and 58 and to points P and Q of this network is connected the output of coil 45. By adjustment of the electrode potentials of pentode 13, the E. M. F. appearing at coil 45 is made to be $\sqrt{\frac{1}{2}}$ that of the E. M. F. of coil 51 in the unmodulated condition. As a result, there appears in resistor 57 the vector sum of three radio frequency currents, derived from the output circuits of pentodes 13, 14 and 15, having the relative magnitudes respectively, when no modulation is applied, of $\sqrt{2I}$, 2I, I. The phase difference between these currents is that set up by the phasing network 2–8 and the sense in which coils 45, 48 and 51 are connected to the resistor network 52 to 58. These connections are made to produce the phase angles illustrated in Figure 9, where O—13 represents the current due to pentode 13 (relative value $\sqrt{2I}$), O—14 that due to pentode 14 (relative value 2I), and O—15 that due to pentode 15 (relative value I). The vector sum of these potentials is equal to I and is in phase with O—14.

Let us now consider what occurs on modulation. Select any instantaneous value of modulating E. M. F., as indicated by $\theta$ in Figures 7 and 8. The current due to pentode 14 will have the value $I+I\cos\theta$. The current due to pentode 15 will have the value $I+I\sin\theta$. The current due to pentode 13 will remain at $\sqrt{2I}$. The phase angles between these currents is the same as before modulation, but, due to the change in magnitude of O—14 and O—15, the vector sum is changed. It has the same magnitude as before, but is shifted through the angle $\theta$, as shown in Figure 10, exactly in proportion to the amplitude of the modulating E. M. F. Thus there appears across resistor 57 a potential the magnitude of which does not change, but the phase of which is shifted in direct proportion to the amplitude of the modulating E. M. F. up to the limit set by the number of diodes employed—in this case, eight—permitting a complete revolution in each sense for full modulation. This potential is applied to the utilization means 59. Addition of more diodes (one pair for each additional right angle), together with appropriate transformer secondary taps, and sources of bias potential is all that is required for extension of the permissible angle. Note that all bias sources shown are at ground potential insofar as modulating E. M. F.'s are concerned, and hence may be constituted by power rectifiers.

The expression "frequency modulated current" as used herein is intended to include a phase modulated current.

I have described what I believe to be the best embodiments of my invention. I do not wish, however, to be confined to the embodiments shown, but what I desire to cover by Letters Patent is set forth in the appended claims.

I claim:

1. The method of producing a frequency modulated current which comprises the steps of so modulating a first current of substantially constant frequency in accordance with a modulating potential that its instantaneous amplitude is proportional to a function of the sine of a certain variable angle, so modulating a second current displaced in phase from the first current by a substantially constant angle of 90 degrees in accordance with said modulating potential that its instantaneous amplitude is proportional to the same function of the cosine of said variable angle, causing the magnitude of said variable angle to be directly proportional to the instantaneous magnitude of said modulating potential, and combining the two amplitude modulated currents to produce the frequency modulated current.

2. The method of producing a frequency modulated current which comprises the steps of so modulating a first current of substantially constant frequency in accordance with a modulating potential that its instantaneous amplitude bears a certain ratio to the sine of a certain variable angle plus unity, so modulating a second current displaced in phase from the first current by a substantially constant angle of 90 degrees in accordance with said modulating potential that its instantaneous amplitude bears said ratio to the cosine of said angle plus unity, causing the magnitude of said angle to be directly proportional to the instantaneous magnitude of said modulating potential, and combining the two amplitude modulated current, with a third current of constant amplitude which bears said ratio to the square root of two and which is displaced in phase from the first two currents by substantially constant and equal angles of 135 degrees to produce the frequency modulated current.

3. A device for producing a frequency modulated current comprising means for producing a first current of substantially constant frequency, a first modulating means arranged to vary the instantaneous amplitude of the first current, means for obtaining a second current displaced in phase from the first current by a substantially constant angle of 90 degrees, a second modulating means arranged to vary the instantaneous amplitude of the second current, a first means for converting the magnitude of a modulating potential to a value which is a function of the sine of an angle directly proportional to the instantaneous magnitude of the modulating potential, a second means for independently converting the magnitude of said modulating potential to a value which is a function of the cosine of said angle, means for applying the converted modulating potentials separately and simultaneously to the two modulating means, and means for combining the two amplitude modulated currents to produce the frequency modulated current.

4. A device for producing frequency modulated currents comprising means for producing a first current of substantially constant frequency, a first modulating means arranged to vary the instantaneous amplitude of the first current and having a response characteristic upon application of a modulating potential thereto which is a function of the sine of an angle directly proportional to the instantaneous magnitude of the potential, means for obtaining a second current displaced in phase from the first current by a substantially constant angle of 90 degrees, a second modulating means arranged to vary the instantaneous amplitude of the second current and having a response characteristic upon application of a modulating potential thereto which is a function of the cosine of said angle, means for applying a modulating potential simultaneously to the two modulating means, and means for combining the two amplitude modulated currents to produce the frequency modulated currents.

5. A device for producing frequency modulated currents comprising means for producing a first current of substantially constant frequency, means for obtaining a second current displaced in phase from the first current by a substantially constant angle of 90 degrees, means for obtaining a third current displaced in phase from the first two currents by substantially equal angles of 135 degrees, separate modulating means arranged to vary the instantaneous amplitudes of the first and second currents and having response characteristics upon application of a modulating potential thereto which are functions of the sines of complementary angles, both angles being linearly related to the instantaneous magnitude of the modulating potential, means for applying a modulating potential simultaneously to the two modulating means, and means for combining the two amplitude modulated currents with the third unmodulated current to produce the frequency modulated current.

6. A device as in claim 5 in which said separate modulating means includes means having response characteristics which are functions of the sines of the respective angles plus unity.

7. A device for producing frequency modulated currents comprising means for producing a first current of substantially constant frequency, means for obtaining a second current displaced in phase from the first current by a substantially constant angle of 90 degrees, a first modulating means arranged to vary the instantaneous amplitude of the first current and having a response characteristic with respect to a modulating potential, which characteristic, when plotted graphically, has a shape which is substantially that of a sinusoidal wave between two successive and opposite peaks, a first network arranged to modify a modulating potential so that it cyclically and linearly increases and decreases with increasing magnitude of the modulating potential connected to apply the modified modulating potential to the first modulating means, a second modulating means similar to the first modulating means connected to vary the instantaneous amplitude of the second current, a second network similar to the first network except having cyclic peaks of the modified modulating potential disposed intermediate cyclice peaks of the first network with reference to the magnitude of the modulating potential connected to apply the modified modulating potential to the second modulating means, means for applying the modulating potential simultaneously to both networks, and means for combining the two amplitude modulated currents to produce the frequency modulated current.

8. A device as in claim 7 in which each of the modulating means comprises a thermionic tube having a control grid and a suppressor grid in which the current whose amplitude is varied is applied to the control grid and the modified modulating potential is applied to the suppressor grid.

9. A device as in claim 7 in which each network comprises a plurality of biased rectifiers connected to produce the cyclic and linear modification of the modulating potential.

10. A device as in claim 7 in which the combining means comprises a group of resistive circuit elements connected as a balanced bridge, the two amplitude modulated currents being applied to points thereof where one current will have no appreciable effect upon the other.

11. A device for producing frequency modulated currents comprising means for producing a first current of substantially constant frequency, means for obtaining a second current displaced in phase from the first current by a substantially constant angle of 90 degrees, means for obtaining a third current displaced in phase from the first two currents by substantially equal angles of 135 degrees, a first modulating means arranged to vary the instantaneous amplitude of the first current and having a response characteristic with respect to a modulating potential which characteristic, when plotted graphically, has a shape which is substantially that of a sinusoidal wave between two successive and opposite peaks, a first network arranged to modify a modulating potential so that it cyclically and linearly increases and decreases with increasing magnitude of the modulating potential connected to apply the modified modulating potential to the first modulating means, a second modulating means similar to the first modulating means connected to vary the instantaneous amplitude of the second current, a second network similar to the first network except having cyclic peaks of the modified modulating potential disposed intermediate cyclic peaks of the first network with reference to the magnitude of the modulating potential connected to apply the modified modulating potential to the second modulating means, means for applying the modulating potential simultaneously to both networks, and means for combining the two amplitude modulated currents with a predetermined constant portion of the third current to produce the frequency modulated current.

12. A device as in claim 11 in which each of the modulating means comprises a thermionic tube having a control grid and a suppressor grid in which the current whose amplitude is varied is applied to the control grid and the modified modulating potential is applied to the suppressor grid.

13. A device as in claim 11 in which each network comprises a plurality of biased rectifiers connected to produce the cyclic and linear modification of the modulating potential.

14. A device as in claim 11 in which the combining means comprises two groups of resistive circuit elements, a first group being connected as a balanced bridge, the first group being interconnected with the circuit elements of the other group to form a further balanced bridge in which the first group constitutes one arm thereof and the two amplitude modulated currents and the third current are applied to points of the two balanced bridges such that no one of the three currents will have an appreciable effect upon either the other two.

LIONEL T. BIRD.

REFERENCES CITED

The following references are of record in the file of this patent:

UNITED STATES PATENTS

| Number | Name | Date |
|---|---|---|
| 2,130,172 | Armstrong | Sept. 12, 1938 |
| 2,210,968 | Wirkler | Aug. 13, 1940 |
| 2,220,201 | Bliss | Nov. 5, 1940 |
| 2,347,458 | Brown | Apr. 25, 1944 |